(12) United States Patent
Rossotto

(10) Patent No.: US 9,914,536 B2
(45) Date of Patent: Mar. 13, 2018

(54) METHOD OF ACTIVATING AN ELECTRIC MOTOR IN A HYBRID POWER PLANT OF A MULTI-ENGINED AIRCRAFT, AND AN AIRCRAFT

(71) Applicant: AIRBUS HELICOPTERS, Marignane (FR)

(72) Inventor: Regis Rossotto, Marseilles (FR)

(73) Assignee: Airbus Helicopters, Marignane (FR)

( * ) Notice: Subject to any disclaimer, the term of this patent is extended or adjusted under 35 U.S.C. 154(b) by 90 days.

(21) Appl. No.: 15/152,721

(22) Filed: May 12, 2016

(65) Prior Publication Data

US 2016/0375994 A1 Dec. 29, 2016

(30) Foreign Application Priority Data

May 15, 2015 (FR) ...................................... 15 01001

(51) Int. Cl.
*B64C 27/14* (2006.01)
*B64C 27/12* (2006.01)
(Continued)

(52) U.S. Cl.
CPC .............. *B64C 27/14* (2013.01); *B64C 27/12* (2013.01); *B64D 27/02* (2013.01); *B64D 27/10* (2013.01);
(Continued)

(58) Field of Classification Search
CPC ......... B64C 27/14; B64C 27/12; B64C 27/02; B64C 27/10; B64C 27/24;
(Continued)

(56) References Cited

U.S. PATENT DOCUMENTS 8,283,796 B2    10/2012    Certain
8,727,271 B2    5/2014     Salyer
(Continued)

FOREIGN PATENT DOCUMENTS

CN    103253370 A1    8/2013
EP    2148066         1/2010
(Continued)

OTHER PUBLICATIONS

French Search Report for French Application No. FR1501001, Completed by the French Patent Office on Mar. 10, 2016, 7 Pages.
(Continued)

*Primary Examiner* — McDieunel Marc
(74) *Attorney, Agent, or Firm* — Brooks Kushman P.C.

(57) ABSTRACT

A method of driving rotation of a rotor of an aircraft, said aircraft having at least two fuel-burning engines and an electric motor suitable for driving rotation of said rotor. Said rotor is driven by using said engines together. An authorization is generated only during at least one predetermined stage of flight, said authorization authorizing the use of the electric motor in order to drive said rotor in rotation. While said authorization is valid and if one of said engines has failed, then an operation order is generated to require said electric motor to operate. While said operation order is valid, said rotor is driven by each engine that has not failed together with said electric motor.

16 Claims, 1 Drawing Sheet

(51) Int. Cl.
    *B64D 27/02* (2006.01)
    *B64D 27/10* (2006.01)
    *B64D 27/24* (2006.01)

(52) U.S. Cl.
    CPC ........ *B64D 27/24* (2013.01); *B64D 2027/026* (2013.01); *Y02T 50/64* (2013.01)

(58) Field of Classification Search
    CPC ... B64C 2027/026; Y02T 50/64; B60C 27/12; B64D 27/02; B64D 27/10; B64D 27/24; B64D 2027/026
    USPC .......................................................... 701/3
    See application file for complete search history.

(56) References Cited

U.S. PATENT DOCUMENTS

| | | |
|---|---|---|
| 8,757,542 B2 | 6/2014 | Hopdjanian et al. |
| 9,008,942 B2 | 4/2015 | Dyrla et al. |
| 9,038,939 B2 | 5/2015 | Dyrla et al. |
| 2012/0025032 A1* | 2/2012 | Hopdjanian .......... B60L 3/0046 244/53 R |
| 2012/0153074 A1* | 6/2012 | Nannoni ............... G05D 1/0858 244/17.13 |
| 2013/0264412 A1 | 10/2013 | Dyrla |
| 2014/0034781 A1 | 2/2014 | Kouros et al. |
| 2014/0054411 A1 | 2/2014 | Connaulte et al. |
| 2014/0145028 A1 | 5/2014 | Gomez |
| 2015/0122944 A1 | 5/2015 | Dauriac et al. |
| 2015/0344128 A1* | 12/2015 | Sandri .................... B64C 13/18 244/223 |
| 2016/0236790 A1* | 8/2016 | Knapp .................. B64C 11/001 |

FOREIGN PATENT DOCUMENTS

| | | |
|---|---|---|
| FR | 2962404 | 1/2012 |
| FR | 2978124 | 1/2013 |
| FR | 2997382 | 5/2014 |
| FR | 2998542 | 5/2014 |
| WO | 2014009620 | 1/2014 |

OTHER PUBLICATIONS

Chinese First Office Action Dated Nov. 16, 2017, Application No. 201610312593.4, Applicant Airbus Helicopters, 9 pages.

* cited by examiner

METHOD OF ACTIVATING AN ELECTRIC MOTOR IN A HYBRID POWER PLANT OF A MULTI-ENGINED AIRCRAFT, AND AN AIRCRAFT

CROSS REFERENCE TO RELATED APPLICATION

This application claims priority to French patent application No. FR 15 01001 filed on May 15, 2015, the disclosure of which is incorporated in its entirety by reference herein.

BACKGROUND OF THE INVENTION (1) Field of the Invention

The present invention relates to a method of activating an electric motor in a hybrid power plant of a multi-engined aircraft, and to an aircraft applying the method.

(2) Description of Related Art

An aircraft may have a hybrid power plant with a plurality of engines/motors. In particular, a rotorcraft is provided with at least one engine for driving at least one rotor in rotation via at least one main power transmission gearbox.

A power plant may possess at least two fuel-burning engines, for example. In addition, the power plant may optionally be fitted with at least one electric motor suitable for delivering additional power.

Such a power plant is thus referred to as a "hybrid" power plant because of the presence of engines and an electric motor.

The use of an electric motor on a vehicle, and in particular an aircraft, raises difficulties. Electrical energy can only be stored in batteries, however batteries present harmful weight.

Under such circumstances, the extra power delivered by an electric motor can be affected by the presence of heavy batteries required to power such an electric motor.

Document FR 2 998 542 describes a rotary wing aircraft having three motors/engines, and a method of controlling the aircraft.

In particular, the aircraft has two main engines and a main regulator system regulating the main engines in application of a variable speed setpoint. The aircraft also includes a secondary motor, and a secondary regulator system regulating the secondary motor in application of a constant setpoint. The secondary regulator system is independent of the main regulator system.

The two main engines are fuel-burning engines, and the secondary motor may be an electric motor.

The secondary motor may be started or used continuously during a flight, or it may be used intermittently in application of alternative procedures. In particular, the secondary motor is inhibited in flight while the aircraft is flying at a speed of advance that is greater than a speed threshold.

Document FR 2 962 404 describes an architecture for a rotary wing aircraft with a hybrid power plant. That architecture has fuel-burning engines connected to a main power transmission gearbox. That architecture also includes an electrical machine that is likewise mechanically engaged with the main gearbox.

Document WO 2014/009620 describes an architecture having two main engines. That architecture also includes an auxiliary engine connected to the two main engines.

Document U.S. Pat. No. 8,727,271 describes an aircraft having a turboshaft engine. The turboshaft engine is connected to an electricity generator. The electricity generator then powers an electric motor suitable for rotating a rotor or a propeller.

Furthermore, the aircraft has batteries suitable for powering the electric motor.

Document EP 2 148 066 describes a power plant having an electric motor for starting a turboshaft engine. The electric motor can operate in flight in generator mode to generate electricity, or in motor mode in order to contribute to driving a main power transmission gearbox.

Document FR 2 978 124 describes a method of controlling a group of engines developing power required to drive a rotor. The group of engines has at least one electrical member, electricity storage means, and a first number of fuel-burning engines greater than or equal to two. A processor unit executes instructions for evaluating a main condition whereby the group of engines can develop the required power while resting one of the fuel-burning engines, and where appropriate for resting one engine and accelerating a second number of non-resting engines, and for making the electrical member operate in motor mode, if necessary, the electrical member operating temporarily in electricity generator mode when the storage means is discharged.

Document FR 2 997 382 describes a method of managing an engine failure on a rotary wing aircraft having a hybrid power plant with at least two fuel-burning engines, at least one electrical machine, and a main power transmission gearbox. In that method, the operation of the engines is monitored during each flight in order to detect a failure of any one of them.

Document US 2014/0034781 is also known.

BRIEF SUMMARY OF THE INVENTION

An object of the present invention is to propose a method of activating an electric motor in a hybrid power plant.

The invention thus provides a method of driving rotation of a rotor of an aircraft, the aircraft having at least two fuel-burning engines and an electric motor suitable for driving rotation of the rotor.

The method is remarkable in particular in that the following steps are performed in succession:

the rotor is driven by using the engines together;

an authorization is generated only during at least one predetermined stage of flight, the authorization authorizing the use of the electric motor in order to drive the rotor in rotation;

while said authorization is valid, an operation order is generated to require the electric motor to operate if one of the engines is considered as failed; and while the operation order is valid, the rotor is driven by each engine that is not considered as failed together with the electric motor.

Consequently, the aircraft has at least two fuel-burning engines and one electric motor, all of which can contribute to setting a rotor into motion. Such a rotor is a rotor suitable for contributing to providing the aircraft with lift and/or propulsion.

The method of the invention determines precisely the conditions under which the electric motor is used for contributing to driving the rotor in rotation.

The method makes no provision for driving the rotor permanently by using the electric motor.

In addition, the method makes no provision for necessarily driving the rotor with at least one electric motor following a failure of an engine.

Likewise, the method makes no provision for necessarily driving the rotor with at least one electric motor when the aircraft is in a predetermined stage of flight.

According to the invention, the rotor is driven under normal conditions by the engines. During a step referred to for convenience as an "initial" step, the engines are both used for setting the rotor into motion.

During a step of estimating the stage of flight, the systems of the aircraft determine whether the aircraft is flying in a predetermined stage of flight.

A predetermined stage of flight represents a stage of flight during which the electric motor is capable of delivering a favorable increase in power. The manufacturer can determine the nature of such stages of flight by testing, simulations, calculations, or experience.

The electric motor can thus be used only during such predetermined stages of flight.

Nevertheless, such a condition is not sufficient for activating the electric motor.

Under such circumstances, the step of estimating the stage of flight consists solely in generating authorization to use the electric motor while the aircraft is flying in a predetermined stage of flight. This authorization means merely that the electric motor can be used, if necessary.

Consequently, during a step of estimating the health of the engines, systems of the aircraft determine whether an engine should be considered as failed.

The term "if an engine is considered as failed" should be interpreted broadly. This term means that an engine is not operating well, for example by delivering power lower than the power that should normally be delivered by the engine. Thus, an engine is considered as failed if the engine has stopped involuntarily, if the engine has been stopped voluntarily, or if a malfunction is detected.

The term "if an engine is considered as failed" is thus close in meaning to the term "heave to" in sailing.

If an engine is considered as failed, and if authorization has been given to use the electric motor, then an operation order is prepared.

The operation order is then transmitted to the electric motor in order to require the electric motor to operate to drive the rotor in rotation during a hybridization step.

Consequently, the method of the invention makes provision for an activation sequence that is clear, leading to the electric motor operating only under particular circumstances. Two conditions need to be satisfied simultaneously for the electric motor to be used, namely a first condition concerning the current stage of flight and a second condition concerning the operation of the engines.

The invention consists on the one hand in detecting whether an engine is not operating well, and on the other hand in detecting whether the current stage of flight is a stage of flight requiring the provision of additional power. The combination of these two conditions is necessary in order to activate the electric motor.

Consequently, the electric motor can be used in motor mode for driving a rotor only under particular conditions that occur rarely in flight.

In particular, the electric motor is not used for driving the rotor if the power contribution generated by the electric motor is not needed.

Under such circumstances, the electric motor can be dimensioned to be small in size and to consume only a small amount of electrical energy. The method of the invention thus enables an electric motor to be arranged on an aircraft in a manner that is less penalizing from a weight point of view and in terms of size than an arrangement in which an electric motor is likely to be used often.

The method may also include one or more of the following characteristics.

For example, the aircraft has one management system per engine and an avionics system communicating with the management systems, the authorization is generated by the avionics system, the authorization being transmitted to each management system, the operation order being issued by a management system and transmitted to the electric motor.

Conventionally, an engine may be controlled by a management system. For example, a management system for a turboshaft engine comprises in particular a computer and a fuel metering unit. Such a management system may then be a system known as a full authority digital engine control (FADEC).

An aircraft also has a system sometimes known as its "avionics" system. An avionics system comprises electronic, electrical, and computer equipment that assists in piloting aircraft.

Under such circumstances, the function of the avionics systems is to detect whether the aircraft is flying in a predetermined stage of flight in which the operation of the electric motor can be authorized.

If so, the avionics system sends the authorization to the management systems. Under such circumstances, if a management system considers an engine as failed, then this management system issues the operation order.

The operation order may be transmitted to the electric motor directly by the management system, or indirectly via the avionics system.

The method is then relatively simple, and it makes it possible to define clearly the steps to be performed in succession for activating the electric motor, i.e. for using the electric motor for the purpose of driving a rotor in rotation.

Furthermore, if an engine is considered as failed and if said authorization has not been given, the electric motor is not used to drive the rotor.

During an iteration during the operation of the power plant, a management system may consider an engine as failed.

If the avionics system issued an "authorization" during the preceding iteration, then the management system generates the operation order to order operation of the electric motor.

In contrast, if in the preceding iteration the avionics system did not issue the "authorization", then the management system does not generate the operation order.

Furthermore, each predetermined stage of flight may be a stage of flight that requires a given power for driving the rotor, the given power being less than the maximum power delivered by the engines when one of the engines is considered as failed.

The given power may represent a minimum power to be delivered to ensure flight, or indeed a minimum power plus a safety margin.

On each calculation iteration, and under these conditions, the avionics system determines whether the current stage of flight is a stage of flight that would require the provision of additional power if an engine were to be considered as failed. Under such circumstances, the authorization is issued in order to guarantee flight safety should an engine need to be considered as failed in the future.

Furthermore, and in a variant, the authorization is inhibited while the aircraft is standing on the ground.

The term "ground" should be understood broadly as covering both a solid surface and a liquid surface. The ground thus refers by way of example both to land and to water. Some aircraft have the capability of "alighting" on water.

In this variant, no authorization is delivered while on the ground. There is no risk of the aircraft crashing while it is standing on the ground. Consequently, the method makes it possible to avoid ever making use of the electric motor in this configuration.

Furthermore, a predetermined stage of flight may be a "low speed" stage of flight during which said aircraft has a speed of advance less than a threshold speed of advance.

The threshold speed of advance is of the order of 50 knots (kts), for example.

The avionics system determines the speed of advance of the aircraft. By way of example, this speed of advance may be the true air speed (TAS) of the aircraft or indeed the indicated air speed (IAS).

According to performance studies undertaken by the Applicant, the power that needs to be delivered by a rotorcraft power plant increases when its speed of advance decreases in the low speed range. Thus, when flying at low speed, e.g. while hovering or climbing or descending, the power that is needed in the event of an engine failing is greater than when flying at high speed. The method of the invention thus authorizes the electric motor to operate during stages of flight at low speed.

Under such circumstances, a "current" speed of advance of the aircraft can be determined and compared with the threshold speed of advance, said authorization being given if said current speed is less than said threshold speed of advance.

The current speed represents the current value of the speed of advance at each calculation iteration. In general, the term "current" refers to the calculation iteration that is being processed.

This current speed is thus compared by conventional calculation methods with the threshold speed of advance stored by the manufacturer.

Furthermore, a predetermined stage of flight may be a stage of flight with little power margin during which at least one engine presents a power margin relative to a predetermined power limit that is less than a power threshold.

Each engine operates at a current operating rating. Each rating may be associated with a limit power. For example, an aircraft may use:

a takeoff rating associating a maximum takeoff power (TOP) with a utilization duration of about five to ten minutes; or a maximum continuous power rating associating a maximum continuous power (MCP) with an unlimited utilization duration.

Contingency overpower ratings are also used on a power plant having a plurality of engines in the event of one of the engines being inoperative (OH). The following contingency overpower ratings are known:

a first contingency rating associating a supercontingency power OEI30" having a duration of the order of thirty consecutive seconds, this first contingency rating being usable about three times during a flight;

a second contingency rating associating a maximum contingency power OEI2' having a utilization duration of about two minutes; and a third contingency rating associating an intermediate contingency power with a utilization duration extending to the end of a flight after a turboshaft engine has failed, for example.

Under such circumstances, when any one rating is in use, a power margin is determined. The power margin lies between the maximum power of the rating and the current power being developed at each calculation iteration by the engine under examination.

If the power margin is less than the stored power threshold, then authorization is given to use the electric motor.

Furthermore, said at least one predetermined stage of flight may comprise a "single-engined" stage of flight during which only one engine is in operation, the single engine operating at a contingency overpower rating, said contingency overpower rating being usable for only a predetermined duration.

For example, the avionics system issues said authorization if an engine is operating at the above-mentioned first contingency rating, i.e. the overpower contingency rating presenting the shortest utilization time.

Furthermore, failure of an engine may be evaluated using various criteria.

Thus, an engine may be considered as failed when the engine is delivering no power.

In alternative manner or additionally, an engine is considered as failed when the engine is stopping or has stopped.

An engine is said to be stopped when none of the members of that engine is moving.

For example, a turboshaft engine may present a gas generator followed by a power assembly having at least one turbine. The turboshaft engine is then stopped when neither the gas generator nor the power assembly is being driven in rotation.

On a piston engine that involves rotating a crankshaft, the engine is stopped when the crankshaft is stationary, for example.

By way of example, a turboshaft engine is considered as stopping when an order has been issued by a pilot to stop the engine.

The engine may be considered as failed regardless of whether stopping is voluntary or involuntary.

A voluntary stop may be determined by monitoring a selector that is used for controlling an engine, such a selector includes a position that requests stopping of an engine.

An involuntary stop may be determined by monitoring operating parameters of the engine, such as the speed of rotation of a member of the engine, for example.

In alternative manner, or in addition, an engine is considered as failed when the engine is idling.

An engine may have provision for an idle rating. When idling, the engine is not stopped, but it is not delivering torque to the dynamic assemblies.

Idling may be triggered in voluntary or involuntary manner.

Voluntarily idling may be determined by monitoring a selector that is used for controlling an engine, such a selector including a position requesting idling operation of an engine.

Involuntarily idling may be determined by monitoring operating parameters of the engine, such as the speed of rotation of a member of the engine, for example.

In alternative manner, or in addition, an engine may be considered as failed if the power developed by the engine is frozen as a result of a malfunction of a system for regulating the flow of fuel and if the torque developed by the engine is less than a torque threshold. The term "frozen" when used to describe the power developed by the engine means that the position of the fuel metering unit is held at the last known valid position. Under such circumstances, without any variation in external ambit air conditions, the power it delivers remains constant regardless of the order given to the flow rate regulator system.

A total failure of the regulator system occurs when, as a result of a malfunction, the management system of an engine is unable to regulate the fuel flow rate (e.g. as a result of a failure of all of the sensors for sensing free turbine speed). A total failure of a fuel flow regulator system can lead to the position of a fuel metering unit being frozen.

The power delivered by an engine following a total failure of regulation may thus be low or high depending on the moment at which the total failure is detected.

Under such circumstances, an operating order is given in this variant if the torque developed by the engine is less than a torque threshold. The torque threshold may lie in the range 10% to 100% of the theoretical torque to be delivered at the current operating rating of the engine in question.

In alternative manner, or in addition, an engine may be considered as failed when the difference between the torque being developed by one engine and the torque being developed by another engine is greater than a predetermined difference.

If a torque difference between two engines is greater than the predetermined difference, then the operation order is issued.

The predetermined difference may lie in the range 2% to 100% of the theoretical torque to be delivered at the current operating rating of the engines under examination.

In addition to a method, the invention also provides an aircraft having at least one rotor, the aircraft having at least two fuel-burning engines and an electric motor suitable for driving the rotor in rotation.

Advantageously, the aircraft is a rotorcraft.

Under such circumstances, the aircraft includes a regulator device implementing the above-described method.

Optionally, the regulator device comprises one management system per engine, each management system controlling one engine, the regulator device including an avionics system communicating with the management systems, and said authorization is generated by the avionics system, said authorization being transmitted to each management system, the operation order being issued by a management system and transmitted to the electric motor.

The operation order is transmitted by a management system to the electric motor either directly or indirectly.

By way of example, said regulator device comprises at least one member selected from the following list: a measurement system for determining a speed of advance of the aircraft, one measurement device per engine for determining the torque being developed by the engine, one measurement device per engine for determining the power being developed by the engine, one sensor per engine for determining the speed of rotation of a member of the engine, a touch device for determining whether the aircraft is standing on ground, and one control selector per engine for requesting at least operation of an engine, or stopping of the engine, or idling of the engine.

The measurement system may include a conventional air data computer (ADC).

The measurement member and the measurement device may comprise a torque meter, with the power being associated with the measured torque. A conventional sensor can be used for measuring the speed of rotation of an engine.

It should be observed that the torque, the power, and a speed of rotation are commonly measured on a rotorcraft turboshaft engine, for example.

Finally, the touch device may include a system arranged on landing gear. For example, a touch device may comprise a system measuring the force exerted on landing gear. Reference may be made to the literature in order to obtain a description of such a touch device.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Figure 1:
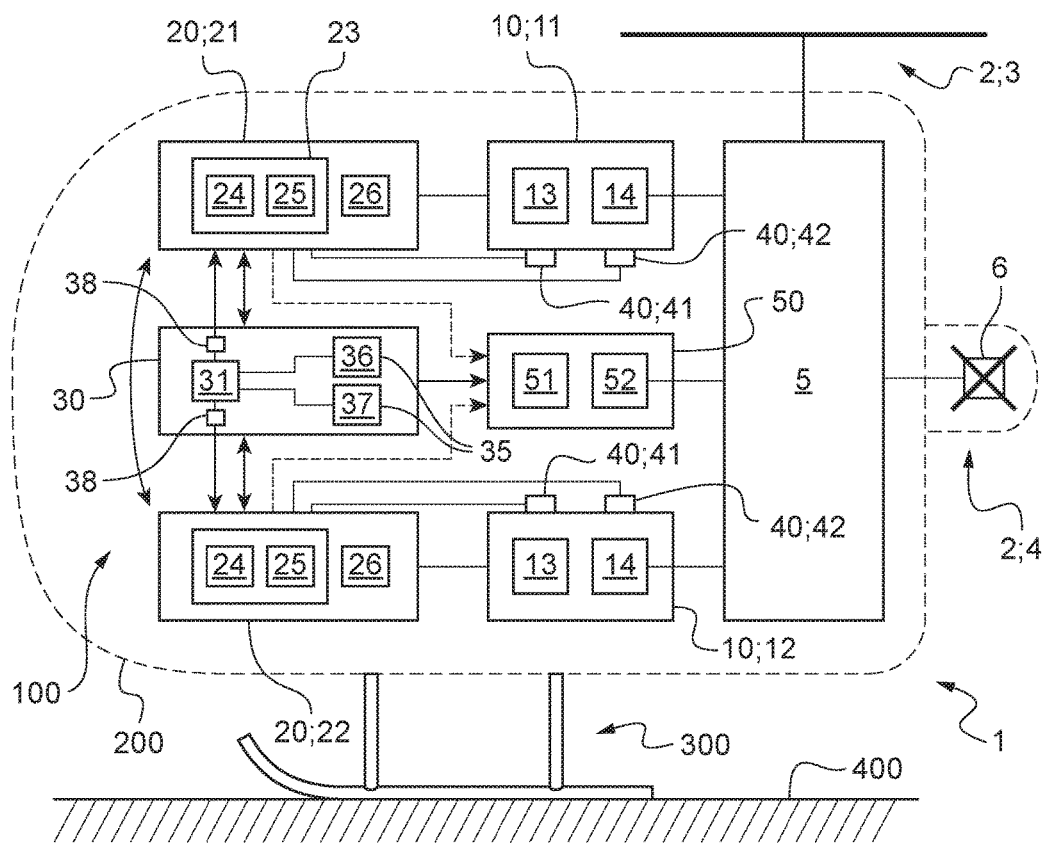
FIG. 1 is a diagram showing an aircraft of the invention.

FIG. 1 shows an aircraft 1 of the invention.

The aircraft 1 has an airframe 200 standing on ground 400 (which may be solid or liquid), via landing gear 300.

The landing gear 300 may comprise skid landing gear or indeed landing gear with wheels or skis, for example. Landing gear 300 could also include buoyancy means (floats).

The airframe 200 carries at least one rotor 2. Such a rotor 2 may be a main rotor 3 contributing to providing the aircraft with lift and possibly also propulsion. A rotor 2 may also comprise a rotor 4 for controlling yaw movement of the aircraft.

In FIG. 1, the aircraft is a rotorcraft, and in particular a helicopter having a main rotor 3 and a yaw movement control rotor 4.

In order to drive each rotor, the aircraft has a power plant with at least two fuel-burning engines 10.

By way of example, each fuel-burning engine is mechanically connected to a main power transmission gearbox 5. The main gearbox 5 sets a rotor mast in rotation that drives the main rotor 3 in rotation. Furthermore, the main gearbox 5 may set a tail power transmission gearbox 6 in rotation, thereby driving rotation of the yaw movement control rotor 4.

Such a fuel-burning engine 10 may be a turboshaft engine, for example. The engine then comprises a gas generator 13 followed by a power assembly 14. The power assembly 14 has at least one turbine mechanically driving the main gearbox 5.

Furthermore, the rotor has at least one electric motor 50. In particular, the aircraft has one electric motor 50. Such an electric motor 50 may be any kind of motor capable of using electricity to drive at least one rotor.

By way of example, each electric motor 50 is mechanically connected to the main gearbox 5.

By way of illustration, the electric motor may include an electronic system (not shown), together with a stator 51 and a rotary member 52.

Furthermore, the aircraft includes a regulator device 100.

The function of the regulator device 100 is to control the fuel-burning engines 10 and the electric motor 50 by applying the method of the invention.

The regulator device thus has one management system 20 per engine 10. A management system 20 may be of the FADEC type. Thus, a first engine 11 is controlled by a first management system 21, with the second engine 12 being controlled by a second management system 22.

Under such circumstances, the management system may include a management computer 23 and a fuel metering unit 26.

By way of example, such a management computer 23 possesses a processor 24 or the equivalent that executes instructions stored in a memory unit 25. Conventionally, the management computer applies regulation relationships stored in the memory unit, in particular for controlling the fuel metering unit of the associated engine.

Each management system 20 may be connected directly or indirectly to measurement means 40 monitoring the operation of the associated engine, or indeed to measurement systems 35 of the aircraft.

Thus, each management system may be connected over a wired or wireless connection to a sensor 41 measuring a speed of rotation Ng of the gas generator 13 of the engine it controls.

Furthermore, each management system may be connected by a wired or wireless connection to a member 42 determining torque and/or power as developed by the power assembly 14 of the engine it controls. For example, a torque meter can be used to measure the torque developed by the power assembly 14 of the controlled engine. Furthermore, a conventional system serves to measure the speed at which the power assembly 14 is being driven in rotation. The power developed by the power assembly 14 is then equal to the product of the measured torque multiplied by the measured rotary drive speed at the point where the torque is measured.

Under such conditions, the management systems of the engines may conventionally communicate with each other in order to exchange information about the operation of said engines.

Furthermore, the regulator device 100 includes an avionics system 30 communicating via a wired or wireless connection with each engine 10 and with the electric motor 50.

By way of example, the avionics system has at least one computer that is referred to for convenience as the "avionics" computer 31.

Furthermore, the avionics system includes various measurement systems 35 for determining information about the operation of the aircraft.

In particular, the avionics computer may communicate with a measurement system 36 suitable for determining the speed of advance of the aircraft. In particular, the measurement system 36 may include an air data computer (ADC) system and/or a positioning system, e.g. of the type known by the acronym GPS.

The avionics computer may also communicate with a touch device 37. Such a touch device 37 serves to evaluate whether the aircraft is standing on the ground.

By way of example, a touch device 37 may comprise a system for determining the force exerted on landing gear 300. If the force is less than a threshold, then the touch device 37 deduces that the aircraft is flying, i.e. that the aircraft is not standing on the ground 400.

Furthermore, the avionics system may include one control selector 38 per engine. For example, a selector may be a selector having three positions, respectively for requiring an engine to operate, or to stop, or to idle.

Figure 2:
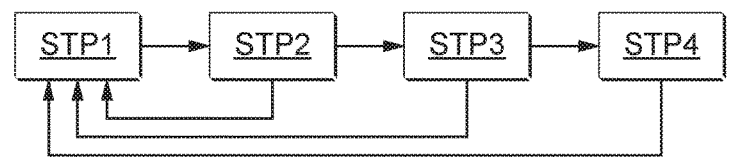
FIG. 2 is a diagram showing the method of the invention.

Under such circumstances, the aircraft 1 applies the method of the invention as shown in FIG. 2.

During an initial step STP1, each rotor 2 is set into motion by the engines.

The first engine 11 and the second engine 12 act together to drive the rotors 2 via the gearboxes 5 and 6. The management systems 20 control the fuel metering units 26 by applying appropriate regulation relationships.

In contrast, the electric motor is not in operation in motor mode during this initial step STP1. The rotary member 52 therefore does not drive the rotors 2. The electric motor might possibly take energy from the main gearbox 5 by operating in an alternator mode.

During a step STP2 of estimating the stage of flight, an authorization is generated to authorize using the electric motor 50 in order to drive rotation of the rotors 2, only if the aircraft is operating in a predetermined stage of flight.

Issuing the authorization does not suffice to enable the electric motor to be used to drive the rotors, but it constitutes a prerequisite for such use.

For example, the avionics system 30 determines the current stage of flight of the aircraft using the measurement systems 35, and it compares this current stage of flight with predetermined stages of flight.

If the aircraft is flying in one of the predetermined stages of flight, the avionics system transmits said authorization to each management system 20.

In this method, at least one predetermined stage of flight may be a stage of flight that requires a given power for driving the rotors 2, this given power being greater than the maximum power delivered by the engines 10 together in the event of a failure of one of said engines 10.

Consequently, a predetermined stage of flight is a stage of flight during which each engine in isolation is not sufficient for obtaining the given power needed to maintain the current mission.

In addition, authorization may be inhibited when the aircraft 1 is standing on the ground 400. Consequently, in this option, a predetermined stage of flight is a stage that occurs while in flight, in the strict meaning of the term "flight", i.e. above the ground.

Under such circumstances, the avionics computer 31 interrogates the touch device 37 to determine whether the aircraft is standing on the ground.

For example, at least one predetermined stage of flight comprises a stage of flight at low speed. A stage of flight is said to be at "low speed" when the aircraft is moving at a speed of advance less than a threshold speed of advance.

Under such circumstances, the avionics computer 31 interrogates the measurement system 36 to determine a "current" speed value for the speed of advance of the aircraft 1.

The avionics computer 31 compares this current speed with a threshold speed of advance stored in a memory of the avionics computer 31. The authorization is then given by the avionics computer 31 if the current speed is less than the threshold speed of advance.

Furthermore, said at least one predetermined stage of flight may comprise a stage of flight with little power margin. A stage of flight is said to be "with little power margin" when at least one engine 10 presents a power margin relative to a predetermined power limit that is less than a power threshold.

Each management system transmits to the avionics system a "current" power that is being developed by the corresponding engine. Furthermore, the management system can transmit a power limit to be complied with for the current operating rating of the engine.

Under such circumstances, the avionics computer 31 deduces a current power margin therefrom for each engine. The avionics computer 31 then compares this current power margin with a stored power limit. If the current power margin is less than the power limit, then the avionics computer issues said authorization.

In addition, said at least one predetermined stage of flight may include a single-engined stage of flight. A stage of flight is said to be "single-engined" when only one engine 10 is in operation, with the sole engine 10 operating at a contingency overpower rating, which contingency overpower rating can be used for only a predetermined duration.

Under such circumstances, the management systems inform the avionics system that an engine has failed. The management system of the engine that is in operation can specify which operating rating is in use.

Specifically, the engine may operate at any one of a plurality of different overpower ratings.

Under such circumstances, the avionics system issues authorization to use the electric motor if the engine 10 in operation is using a particular contingency overpower rating, namely a contingency overpower rating that can be used only for a predetermined duration.

In a step STP3 of estimating the health of the engines, it is determined whether an engine needs to be considered as failed.

If an engine is considered as failed and if said authorization has been given, then an operation order is generated to require the electric motor 50 to operate.

In contrast, if an engine 10 is considered as failed and if said authorization has not been given, the operation order is not issued.

For example, the operation order is issued by a management system 20. The operation order may be issued either by the management system considering the failure of an engine, or by the other management system, for example.

This operation order is transmitted during a hybridizing step STP4 to the electric motor. The electric motor then operates in motor mode in order to contribute to driving rotation of the rotors 2.

The operation order may be transmitted directly from a management system to the electric motor, or it may be transmitted indirectly via the avionics system 30.

During the step STP3 of estimating the health of the engines, an engine 10 may be considered as failed when the engine 10 is not delivering any power.

For example, the management system of an engine determines the current power being developed by that engine by interrogating the measurement device 42.

If the current power is zero and if said authorization has been issued, the management system delivers the operation order.

An engine 10 may also be considered as failed when the engine 10 is stopping or has stopped, whether voluntarily or involuntarily.

By way of example, a management system may detect that the gas generator of a turboshaft engine or the crankshaft of a piston engine is not moving on the basis of information coming from a sensor 41.

Such a failure may be detected in conventional manner, and may give rise to a "FAIL DOWN" alarm being issued.

If a pilot operates the selector 38 in order to stop an engine voluntarily, the management system of that engine stops the associated engine. Furthermore, the management system issues the operation order if said authorization has been issued.

An engine can also be considered as failed when the engine is idling.

By way of example, a management system may detect that the gas generator of a turboshaft engine is rotating at a predetermined idling speed.

Such a failure may be detected in conventional manner, and may give rise to a "FAIL IDLE" alarm being issued.

If a pilot operates the selector 38 to cause an engine to idle, the management system of that engine then causes the associated engine to idle. Furthermore, the management system issues the operation order if said authorization has been issued.

In addition, an engine 10 is considered as failed if the power developed by the engine 10 is frozen as a result of a malfunction of a system 23, 36 for regulating the fuel flow rate and if the torque developed by the engine 10 is less than a torque threshold.

The management system of an engine can thus identify that the power developed by the neighboring engine has frozen when the level of torque exerted by the neighboring engine is less than a stored torque threshold. The management system then issues the operation order if said authorization has been issued.

Such a failure can be detected in the usual manner, and may give rise to a "FAIL FREEZE" alarm being issued.

An engine 10 is also considered as failed when the difference between the torque being developed by one engine 10 and the torque being developed by another engine 10 is greater than a predetermined difference.

The management systems communicate with each other in order to compare the torque developed by the engines. If a large difference is identified between these torques, and if said authorization has been issued, the management system then issues the operation order.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of driving rotation of a rotor of an aircraft, the aircraft having at least two fuel-burning engines and an electric motor suitable for driving rotation of the rotor, the aircraft further having a regulator in communication with the engines and the electric motor, the method comprising:
   driving the rotor by using the engines together;
   generating, by the regulator, an authorization only during the aircraft operating in one of at least one predetermined stage of flight, the authorization authorizing the use of the electric motor to drive the rotor in rotation;
   generating, by the regulator, while the authorization is valid, an operation order to require the electric motor to operate if one of the engines is considered as failed;
   driving, while the operation order is valid, the rotor by using each engine that is not considered as failed and by using the electric motor; and
   inhibiting, by the regulator, the electric motor from being used to drive the rotor other than when both conditions of (i) the aircraft is operating in one of the at least one predetermined stage of flight and (ii) one of the engines is considered as failed occur concurrently.

2. The method according to claim 1, wherein the regulator has one management system per engine and an avionics system communicating with the management systems, the avionics system configured to generate the authorization and transmit the authorization to each management system, and at least one of the management systems configured to generate the operation order and transmit the operation order to the electric motor.

3. The method according to claim 1, wherein each predetermined stage of flight is a stage of flight that requires a given power for driving the rotor, the given power being less than the maximum power delivered by the engines when one of the engines is considered as failed.

4. The method according to claim 1, further comprising inhibiting the authorization from being generated while the aircraft is standing on the ground.

5. The method according to claim 1, wherein the at least one predetermined stage of flight includes a stage of flight at low speed during which the aircraft has a speed of advance less than a threshold speed of advance.

6. The method according to claim 5, wherein a "current" speed is determined for the speed of advance of the aircraft and the regulator compares the current speed with the threshold speed of advance, the regulator generating the authorization when the current speed is less than the threshold speed of advance.

7. The method according to claim 1, wherein a predetermined stage of flight is a stage of flight with little power margin during which at least one engine presents a power margin relative to a predetermined power limit that is less than a power threshold.

8. The method according to claim 1, wherein a predetermined stage of flight is a single-engined stage of flight during which only a single one of the engines is in operation and is operating at a contingency overpower rating usable for only a predetermined duration.

9. The method according to claim 1, wherein an engine is considered as failed when the engine is delivering no power.

10. The method according to claim 1, wherein an engine is considered as failed when the engine is stopping or has stopped.

11. The method according to claim 1, wherein an engine is considered as failed when the engine is idling.

12. The method according to claim 1, wherein an engine is considered as failed when the power developed by the engine is frozen as a result of a malfunction of a system for regulating the flow of fuel and when the torque developed by the engine is less than a torque threshold.

13. The method according to claim 1, wherein an engine is considered as failed when the difference between the torque being developed by one engine and the torque being developed by another one of the engines is greater than a predetermined difference.

14. An aircraft comprising:
at least one rotor;
at least two fuel-burning engines suitable for driving the rotor in rotation;
an electric motor suitable for driving the rotor in rotation; and
a regulator in communication with the engines and the electric motor, the regulator configured to
  drive the rotor by using the engines together;
  generate an authorization only during the aircraft operating in one of at least one predetermined stage of flight, the authorization authorizing the use of the electric motor to drive the rotor in rotation;
  generate, while the authorization is valid, an operation order to require the electric motor to operate if one of the engines is considered as failed;
  drive, while the operation order is valid, the rotor by using each engine that is not considered as failed and by using the electric motor; and
  inhibit the electric motor from being used to drive the rotor other than when both conditions of (i) the aircraft is operating in one of the at least one predetermined stage of flight and (ii) one of the engines is considered as failed occur concurrently.

15. The aircraft according to claim 14, wherein the regulator includes one management system per engine, each management system configured to control one engine, the regulator further including an avionics system communicating with the management systems, the avionics system configured to generate the authorization and transmit the authorization to each management system, and at least one of the management systems configured to generate the operation order and transmit the operation order to the electric motor.

16. The aircraft according to claim 15, wherein the regulator includes at least one member selected from the following list: a measurement system for determining a speed of advance of the aircraft, one measurement device per engine for determining the torque being developed by the engine, one measurement device per engine for determining the power being developed by the engine, one sensor per engine for determining the speed of rotation of a member of the engine, and a touch device for determining whether the aircraft is standing on ground.

* * * * *